(12) United States Patent
Fujinaga

(10) Patent No.: US 6,606,456 B2
(45) Date of Patent: Aug. 12, 2003

(54) IMAGE-SHAKE CORRECTING DEVICE

(75) Inventor: Nobuhiro Fujinaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/114,460

(22) Filed: Apr. 3, 2002

(65) Prior Publication Data

US 2002/0159769 A1 Oct. 31, 2002

(30) Foreign Application Priority Data

Apr. 6, 2001 (JP) ....................................... 2001-107912
May 22, 2001 (JP) ....................................... 2001-151761

(51) Int. Cl.$^7$ ................................................. G03B 5/00
(52) U.S. Cl. ......................................................... 396/55
(58) Field of Search .................... 396/55; 359/554–557; 348/208.11

(56) References Cited

U.S. PATENT DOCUMENTS 5,266,988 A * 11/1993 Washisu ...................... 396/55

* cited by examiner

Primary Examiner—W. B. Perkey
(74) Attorney, Agent, or Firm—Fitzpatrick, Cella, Harper & Scinto

(57) ABSTRACT

There is provided an image-shake correcting device having a correcting optical unit, which is capable of performing image shake correction with high accuracy using a simple construction and without reducing the degree of freedom of layout and without the need to increase the size of the device. At least one magnet member is provided in the correcting optical unit. At least one coil member is arranged away from the magnet member in a direction of the optical axis of the optical unit. A first magnetic member is arranged away from the magnet member in the direction of the optical axis. A second magnetic member is arranged away from the magnet member in the direction of the optical axis and at a side of the magnetic member remote from the first magnetic member. Energization of the coil member causes the correcting optical unit to be driven in a direction intersecting with the optical axis to correct image shakes.

11 Claims, 13 Drawing Sheets

IMAGE-SHAKE CORRECTING DEVICE

BACKGROUND OF THE INVENTION

1. Field of the Invention

The present invention relates to an image-shake correcting device having correcting means for correcting image shakes.

2. Description of the Related Art

Modern cameras automatically perform all important operations for photographing such as exposure determination and focusing, so that even unskilled camera operators are unlikely to make mistakes in photographing.

Further, image stabilizing systems have recently been studied, which prevent a photograph from being influenced by shakes of a camera, thereby substantially eliminating factors that induce the photographer's mistakes in photographing.

Here, an image stabilizing system for cameras will be described.

Unwanted shakes of a camera during photographing are vibrations typically having a frequency of 1 to 10 Hz. A basic concept of obtaining photographs free from image shakes even if the camera shakes at the time of shutter release is that vibrations of the camera resulting from shakes thereof are detected, and a correcting lens is displaced based on the detected vibration value. Therefore, to take photographs having no image shakes or image blurs even with shakes of the camera, first, vibrations of the camera must be accurately detected, and secondly, changes in the optical axis due to shakes of the camera must be corrected.

A basic system for detecting vibrations or shakes of a camera is realized by a shake detecting device installed in the camera, which is comprised of a shake sensor for detecting acceleration, angular acceleration, angular velocity, angular displacement, or the like, and an arithmetic section that arithmetically processes an output from the shake sensor, for camera-shake correction. Based on the detected information, correcting means that decenters the photographic optical axis is driven to suppress image shakes.

FIG. 8 is a schematic perspective view generally showing a camera equipped with a conventional image stabilizing system. This image stabilizing system has a function of performing shake correction for vertical and horizontal shakes of the camera as shown by arrows $42p$ and $42y$, respectively, with respect to an optical axis 41.

In the camera 43, reference numerals 43a, 43b, 43c, and 43d denote a release button, a mode dial (including a main switch), a retractable flash unit, and a finder window, respectively.

FIG. 9 is a perspective view showing the internal construction of the camera in FIG. 8. In FIG. 9, reference numerals 44, 51, and 52 denote a camera main body, correcting means, and a correcting lens, respectively. Reference numeral 53 denotes a support frame that freely drives the correcting lens 52 in directions $58p$ and $58y$, shown in the figure, to execute shake corrections in the directions shown by the arrows $42p$ and $42y$ in FIG. 8. The correcting lens 52 will be described later in detail. Reference numerals $45p$ and $45y$ denote shake detecting devices such as an angular velocity meter and an angular acceleration meter which detect shakes of the camera in directions $46p$ and $46y$.

Outputs from the shake detecting devices $45p$ and $45y$ are converted into a drive target value for the correcting means via arithmetic devices $47p$ and $47y$, described later. The drive target value is input to coils provided in the correcting means 51 for shake corrections. Reference numerals 54, $56p$ and $56y$, and $510p$ and $510y$ denote a base plate, permanent magnets, and the coils, respectively.

FIG. 10 is a block diagram showing the details of the arithmetic devices $47p$ and $47y$ in FIG. 9. The arithmetic devices $47p$ and $47y$ are constructed similarly to each other, and therefore in FIG. 10, only the arithmetic device $47p$ is shown and will be described.

The arithmetic device $47p$ is shown enclosed by one-dot chain lines and comprised of a DC cut filter $48p$, a low-pass filter $49p$, an analog-to-digital conversion circuit (hereafter simply referred to as the "A/D conversion circuit") $410p$, and a drive device $419p$, as well as a camera microcomputer 411 which is enclosed by broken lines. The camera microcomputer 411 is comprised of a storage circuit $412p$, a differential circuit $413p$, a DC cut filter $414p$, an integrating circuit $415p$, a storage circuit $416p$, a differential circuit $417p$, and a PWM (Pulse Width Modulation) duty changing circuit $418p$.

In the illustrated example, the shake detecting device $45p$ is comprised of a laser gyro that detects the angular velocity of shakes of the camera 43. The laser gyro is driven in synchronism with turning-on of the main switch of the camera to start detecting the angular velocity of shakes of the camera 43.

An output signal from the shake detecting device $45p$ is subjected to cutting-off of DC bias components superimposed on the signal by the DC cut filter $48p$ composed of an analog circuit. The DC cut filter $48p$ has such a frequency characteristic that frequencies of 0.1 Hz and less are cut off, and thus does not affect the frequency band of shakes of the camera, which typically ranges from 1 to 10 Hz. However, a problem with the characteristic that frequencies of 0.1 Hz and less are cut off is that about 10 seconds elapse after a shake signal has been input from the shake detecting device $45p$ and before the DC components are completely cut off. Thus, a smaller time constant is used for the DC cut filter $48p$ (the characteristic is set such that for example, frequencies of 10 Hz and less are cut off) before, for example, 0.11 seconds elapse after the main switch of the camera is turned on, so that the DC components are cut off in a short time such as 0.1 seconds, and then the time constant is increased (the characteristic is set such that the frequencies of 0.1 Hz and less are cut off), thereby preventing the DC cut filter $48p$ from degrading a shake angular velocity signal from the shake detecting device $45p$.

An output signal from the DC cut filter $48p$ is amplified by the low pass filter $49p$ composed of an analog circuit, at an amplification ratio according to the resolution of the A/D conversion circuit $410p$, while high frequency noise components superposed on the shake angular velocity signal are cut off. This cutting-off of high frequency noise components is carried out to prevent the A/D conversion circuit $410p$ from erroneously sampling the shake angular velocity signal input to the camera microcomputer 411. Further, an output signal from the low pass filter $49p$ is sampled by the A/D conversion circuit $410p$ and the resulting digital signal is delivered to the camera microcomputer 411.

As noted above, the DC bias components are cut off by the DC cut filter $48p$. However, the subsequent amplification by the low pass filter $49p$ causes DC bias components to be again superposed on the shake angular velocity signal. Therefore, the DC bias components must be cut off again in the camera microcomputer 411.

Thus, for example, the DC components are cut off by storing, in the storage circuit 412P, a shake angular velocity signal which is sampled 0.2 seconds after turning-on of the main switch of the camera 43, and determining a difference between the previously stored value and the newly stored shake angular velocity signal by means of the differential circuit 413p. This operation can only roughly cut off the DC components because the shake angular velocity signal stored 0.2 seconds after turning-on of the main switch of the camera 43 contains not only DC components but also actual shake components. Therefore, in a subsequent stage, DC components not removed by the differential circuit 413p are completely cut off by the DC cut filter 414p composed of a digital filter. The time constant of the digital filter 414p can be varied as is the case with the analog DC cut filter 48p. Specifically, the time constant is progressively increased over 0.2 seconds after the lapse of 0.2 seconds have elapsed after turning-on of the main switch of the camera 43. More specifically, the filter characteristic of the DC cut filter 414p is preset such that frequencies of 10 Hz and less are cut off when 0.2 seconds have elapsed after turning-on of the main switch, and subsequently the cutoff frequency of the filter is gradually reduced to 5, 1, 0.5, and 0.2 Hz every 50 msec.

However, if during the above-described operation, the photographer half-depresses the release button 43a (turns on a switch S1) to perform a photometric operation or a distance measuring operation, he is likely to immediately carry out photographing. In such a case, it is not desirable to change the time constant over a considerable time. Therefore, in such a case, the change of the time constant is interrupted depending upon the photographing conditions. For example, if the results of the photometric operation indicate that the shutter speed should be 1/60, and the focal distance is 150 mm, then high shake-correcting precision is not required, so that the change of the time constant for the DC cut filter 414p is stopped when the time constant is changed to such a characteristic as to cut off frequencies of 0.5 Hz and less (the amount of change of the time constant is controlled according to the product of the shutter speed and the shooting focal distance). This reduces the time required to change the time constant, thus giving priority to the shutter chance. Of course, it may be so designed that with a higher shutter speed or a shorter focal distance, the change of the time constant of the DC cut filter 414p is stopped when the time constant is changed to such a characteristic as to cut off frequencies of 1 Hz and less, whereas with a lower shutter speed or a longer focal distance, shooting is inhibited until the change of the time constant to the set greatest value is completed.

The integrating circuit 415p starts integrating output signals from the DC cut filter 414p in response to half depression of the camera release button 43a (turning-on of the switch S1), to convert the angular velocity signal into an angular signal. However, so long as the change of the time constant of the DC cut filter 414p has not been completed yet, the integrating circuit 415p does not perform the integration operation until the change of the time constant is completed, as described previously. Although not shown in FIG. 10, the integrated angular signal is amplified at an amplification ratio according to the current focal distance and object distance information and converted so as to drive the correcting means 51 by an appropriate amount according to the angle of shakes. This correction is required because a zoom focusing operation causes a change in the photographic optical system and hence a change in the amount of eccentricity of the optical axis with respect to the amount by which the correcting means 51 is driven.

When the release button 43a is fully depressed (a switch S2 is turned on), the correcting means 51 starts to be driven in accordance with the shake angular signal. However, at this time, care must be taken such that the correction means 51 does not suddenly start a shake correcting operation. The storage circuit 416p and the differential circuit 417 are provided for this purpose. The storage circuit 416p stores the shake angular signal from the integrating circuit 415p in synchronism with the full depression of the release button 43a (turning-on of the switch S2). The differential circuit 417p determines a difference between the signal from the integrating circuit 415p and a signal from the storage circuit 416p. Thus, when the switch S2 is turned on, the two signals input to the differential circuit 417p are equal to each other, and a drive target value signal supplied to the correcting means 51 from the differential circuit 417p is zero. However, the output from the differential circuit 417p subsequently consecutively increases from zero. That is, the storage circuit 416p plays a role in setting the integration signal as the origin when the switch S2 is turned on. This prevents the correcting means 51 from suddenly starting to be driven.

The target value signal from the differential circuit 417p is input to the PWM duty changing circuit 418p. When voltage or current corresponding to the angle of shakes is applied to the coil 510p (see FIG. 9) provided in the correcting means 51, the correcting lens 52 is driven correspondingly to the angle of shakes. PWM driving is preferably used to save power consumed to drive the correcting means 51 and a drive transistor for the coil.

Thus, the PWM duty changing circuit 418p changes the coil drive duty according to the target value. For example, in the case of PWM using a frequency of 20 KHz, the duty is set to "0" when the target value from the differential circuit 417p is "2,048" and to "100" when the target value is "4,096". Then, the range between the duty of "0" and the duty of "100" is divided at equal intervals so that the duty is determined according to the target value. The duty determination precisely controlled based not only on the target value but also on the current photographing conditions for the camera 43 including temperature, the position of the camera, and the state of the power supply, so as to achieve precise shake corrections.

An output from the PWM duty changing circuit 418p is input to the drive device 419p, which may be a known device such as a PWM driver, and an output from the drive device 419p is applied to the coil 510p (see FIG. 9) provided in the correcting means 51 to carry out shake corrections. The drive device 419p is turned on in synchronism with turning-on of the switch S2 and is turned off once the exposure to the film is completed. Further, even after the exposure has been completed, the integrating circuit 415p continues the integration operation so long as the release button 43a is half-depressed (the switch S1 is on). Then, when the switch S2 is then turned on, the storage circuit 416p again stores a new integration output.

When the half depression of the release button 43a is stopped, the integrating circuit 415p stops integrating outputs from the DC cut filter 414p and is reset. The term "reset", as used herein, refers to an operation of erasing all integrated information.

When the main switch is turned off, the shake detecting device 45p is turned off to complete one image stablization sequence.

Further, when the output signal from the integrating circuit 415p becomes larger than a predetermined value, then it is determined that the camera 43 has performed a panning operation, and the time constant of the DC cut filter 414p is changed. For example, the time constant is changed so that the characteristic that frequencies of 0.2 Hz and less are cut off is changed to one that frequencies of 1 Hz and less are cut off, and is then returned to its original value over a predetermined time period. Specifically, when the output signal exceeds a first threshold, the characteristic of the DC cut filter 414p is set so as to cut off frequencies of 0.5 Hz and less. When the output signal exceeds a second threshold, the characteristic of the DC cut filter 414p is set so as to cut off frequencies of 1 Hz and less. If the output signal exceeds a third threshold, the characteristic of the DC cut filter 414p is set so as to cut off frequencies of 5 Hz and less.

Further, when the output from the integrating circuit 415p becomes very large, the integrating circuit 415p is reset to prevent arithmetic overflow.

In FIG. 10, the DC cut filter 414p starts operating 0.2 seconds after the main switch has been turned on. However, the present invention is not limited to this, but the DC cut filter 414p may be set to start operating when the release button 43a is half-depressed. In this case, the integrating circuit 415p is started to operate when the change of the time constant of the DC cut filter is completed.

Further, as described above, the integrating circuit 415p also starts operating when the release button 43a is half-depressed (the switch S1 is turned on), but may do so when the button 43a is fully depressed (the switch S2 is turned on). In this case, the storage device 416p and the differential circuit 417p are not required.

In FIG. 10, the arithmetic device 47 is provided therein with the DC cut filter 48p and the low pass filter 49p, but it goes without saying that these components may be provided in the shake detecting device 45p.

FIGS. 11 to 13 show the details of the correcting means 51 in FIG. 9. Specifically, FIG. 11 is a front view of the correcting means 51 in FIG. 9, FIG. 12A is a side view of the correcting means 51 as viewed from the direction of an arrow B in FIG. 11, FIG. 12B is a sectional view taken along line A—A in FIG. 11, and FIG. 13 is a perspective view of the correcting means 51 in FIG. 9.

In FIG. 11, the correcting lens 52 is fixed to the support frame 53. The correcting lens 52 is comprised of two lenses 52a and 52b (FIG. 12B) fixed to the support frame 53, and a lens 52c fixed to the base plate 54, to constitute a group of photographic optical systems.

A yoke 55 made of a ferromagnetic material is mounted on the support frame 53. Mounted on the yoke 55 are the permanent magnets 56p and 56y made of neodymium or the like, which are attracted to a rear side surface of the yoke 55 as viewed in the figures, as indicated by hidden lines. Further, three pins 53a radially extend from the support frame 53 and are fitted in elongated holes 54a formed in side walls 54b axially projected from the base plate 54.

As shown in FIGS. 12A and 13, the pairs of the elongated holes 54a and the pins 53a fitted therein serve to prevent back-lash in the direction of the photographic optical axis of the correcting lens 52 (indicated by the optical axis 57 in FIG. 12A). However, since the elongated holes 54a are elongated in a direction orthogonal to the direction of the optical axis 57, the pairs of the elongated holes 54a and the pins 53a restrict movement of the support frame 53 relative to the base plate 54 in the direction of the optical axis 57, while allowing free movement of the support frame 5a in a plane orthogonal to the optical axis 57, as shown by arrows 58p, 58y, and 58r. However, a tension spring 59 is engaged between each hook 53b on the support frame 53 and a corresponding hook 54c on the base plate 54, as shown in FIG. 11, thereby elastically restricting the movement of the support frame 53 in each of the directions 58p, 58y, and 58r.

The coils 510p and 510y are mounted on the base plate 54 in opposed relation to the respective permanent magnets 56p and 56y, as partially shown by hidden lines. The yoke 55, the permanent magnet 56p, and the coil 510p are arranged as shown in FIG. 12B, and the permanent magnet 56y and the coil 510y are similarly arranged. When current is caused to flow through the coil 510p, the support frame 53 is driven in the direction of the arrow 58p. When current is caused to flow through the coil 510y, the support frame 53 is driven in the direction of the arrow 58y.

The amount of driving of the support frame 53 is determined by the balance in each direction between the spring constant of the tension spring 59 and thrust resulting from the coaction between the coils 510p or 510y and the permanent magnets 56p or 56y. That is, the amount of eccentricity of the correcting lens 53 can be controlled by the amount of current flowing through the coils 510p and 510y.

Recent compact cameras have been significantly miniaturized, and correspondingly both the length and diameter of taking lens barrels in which taking lenses are fitted have been substantially reduced.

Under these circumstances, to install the above-described image stabilizing system into a camera, it is desirable to further reduce the size of the correcting means 51, described above with reference to FIGS. 11 to 13.

However, it can be anticipated that the reduction of the size of the correcting means 51 will necessitate arranging peripheral mechanisms such as the shutter, lens driving device, or lens barrier, which are magnetic members, at locations closer to the correcting means 51. In particular, if the magnetic members are located closer to the permanent magnets provided in the correcting means 51, the correcting lens, which is moved in unison with the permanent magnets, can show low responsiveness, i.e. lacks accuracy in its movement to degrade the image stabilization performance. The best way to prevent this is to contrive an improved layout of the camera, but the pursuit of the size reduction might bring about worse situations which cannot be avoided simply by improvement of the layout.

SUMMARY OF THE INVENTION

It is a first object of the present invention to provide an image-shake correcting device which is capable of performing image shake correction with high accuracy using a simple construction and without reducing the degree of freedom of layout and without the need to increase the size of the device, by arranging a second magnetic member that cancels the effects of the magnetic force of a first magnetic member located close to permanent magnets provided in correcting means for correcting image shakes.

It is a second object of the present invention to provide an image-shake correcting device, which employs elastic members that apply elasticity to a correcting lens in a direction in which the correcting lens is driven, and arranges the elastic member at substantially the same location as a support member that supports the correcting lens, and provides support shafts that support the support member with a function of adjusting the elastic force of the elastic members, thereby reducing the space occupied by the elastic members and hence permitting the device to be designed compact in size at low costs without lowering image-shake correcting accuracy, as well as enabling a device or apparatus in which the present device is mounted to be designed compact in size.

To attain the first object, a first aspect of the present invention provides an image-shake correcting device comprising a correcting optical unit having an optical axis, at least one magnet member provided in the correcting optical unit, at least one coil member arranged away from the magnet member in a direction of the optical axis, a first magnetic member arranged away from the magnet member in the direction of the optical axis, and a second magnetic member arranged away from the magnet member in the direction of the optical axis and at a side of the magnetic member remote from the first magnetic member, and wherein energization of the coil member causes the correcting optical unit to be driven in a direction intersecting with the optical axis to correct image shakes.

Preferably, an electromagnetic attractive force exerted between the magnet member and the first magnetic member is substantially equal to an electromagnetic attractive force exerted between the magnet member and the second magnetic member.

Preferably, the first magnetic member comprises a position detecting element having a metal terminal.

More preferably, the position detecting element is a photo interrupter.

Preferably, the second magnetic member comprises an iron-based metal plate.

In a preferred form of the first aspect, the image-shake correcting device comprises a support member that supports the correcting optical unit in a manner permitting same to move in the direction intersecting with the optical axis, and at least one support shaft provided on the support member and projected therefrom in the direction intersecting with the optical axis, and wherein the correcting optical unit has a fitting portion in which the support shaft is fitted, the correcting optical unit being driven in the direction intersecting with the optical axis in response to sliding of the support shaft in the fitting portion.

Preferably, the support shaft is adjustable in position relative to the support member in a direction of the optical axis.

More preferably, the image-shake correcting device comprises an urging member provided on the support shaft, for urging the correcting optical unit in the direction of the optical axis.

According to the first aspect of the present invention, image shakes can be accurately corrected using a simple construction and without reducing the degree of freedom of layout and without the need to increase the size of the device, by arranging the second magnetic member that cancels the effects of the magnetic force of the first magnetic member located close to the permanent magnet provided in the correcting means.

To attain the second object, a second aspect of the present invention provides an image-shake correcting device comprising a correcting optical unit having an optical axis and at least one fitting portion, a support member that supports the correcting optical unit in a manner permitting same to move in a direction intersecting with the optical axis, and a driving unit that drives the correcting optical unit relative to the support member in the direction intersecting with the optical axis, at least one support shaft provided on the support member, the support shaft being fitted in the fitting portion and projected from the support member in the direction intersecting with the optical axis, the support shaft being mounted on the support member in a manner being adjustable in position in a projecting direction thereof relative to the support member, at least one urging member provided on the support shaft, for urging the correcting optical unit in the projecting direction thereof, wherein an urging force of the urging member can be adjusted by adjusting a position of the support shaft, and wherein a driving force of the driving unit drives the correcting optical unit to cause sliding of the correcting optical unit on the support shaft to correct image shakes.

Preferably, the urging member comprises a compression coil spring fitted on the support shaft.

Preferably, the support shaft is threadedly coupled with the support member.

According to the second aspect of the present invention, the support member that supports the correcting lens and the elastic member (urging member) that applies elasticity to the correcting lens in a direction in which the correcting lens is driven are arranged at substantially the same location, and the support shafts that support the support member are each provided with the function of adjusting the elastic force of the elastic member. This construction serves to reduce the space occupied by the elastic member and and hence permit the device to be designed compact in size at low costs without lowering image-shake correcting accuracy, as well as enable a device or apparatus in which the present device is mounted to be designed compact in size.

The above and other objects, features, and advantages of the invention will be more apparent from the following detailed description taken in conjunction with the accompanying drawings.

BRIEF DESCRIPTION OF THE DRAWINGS

FIGS. 4A and 4B are views useful in explaining how a support frame for a correcting lens in FIG. 2 is supported, in which:

FIG. 4A is a fragmentary sectional view of the support frame; and

FIG. 4B is a fragmentary enlarged view of the support frame;

FIGS. 6A to 6C are views showing the construction of essential parts of the image-shake correcting device in FIG. 5, in which:

FIG. 6A is a fragmentary sectional view showing a support frame and a compression coil spring;

FIG. 6B is a fragmentary sectional view showing the support frame; and

FIG. 6C is a fragmentary enlarged view showing the support frame;

FIGS. 12A and 12B are views showing the correcting means 51 in FIG. 11, in which:

FIG. 12A is a side view as viewed from the direction of an arrow B in FIG. 11; and FIG. 12B is a sectional view taken along line A—A in FIG. 11.

DETAILED DESCRIPTION OF THE PREFERRED EMBODIMENTS

The present invention will now be described with reference to the drawings showing preferred embodiments thereof.

Figure 1:
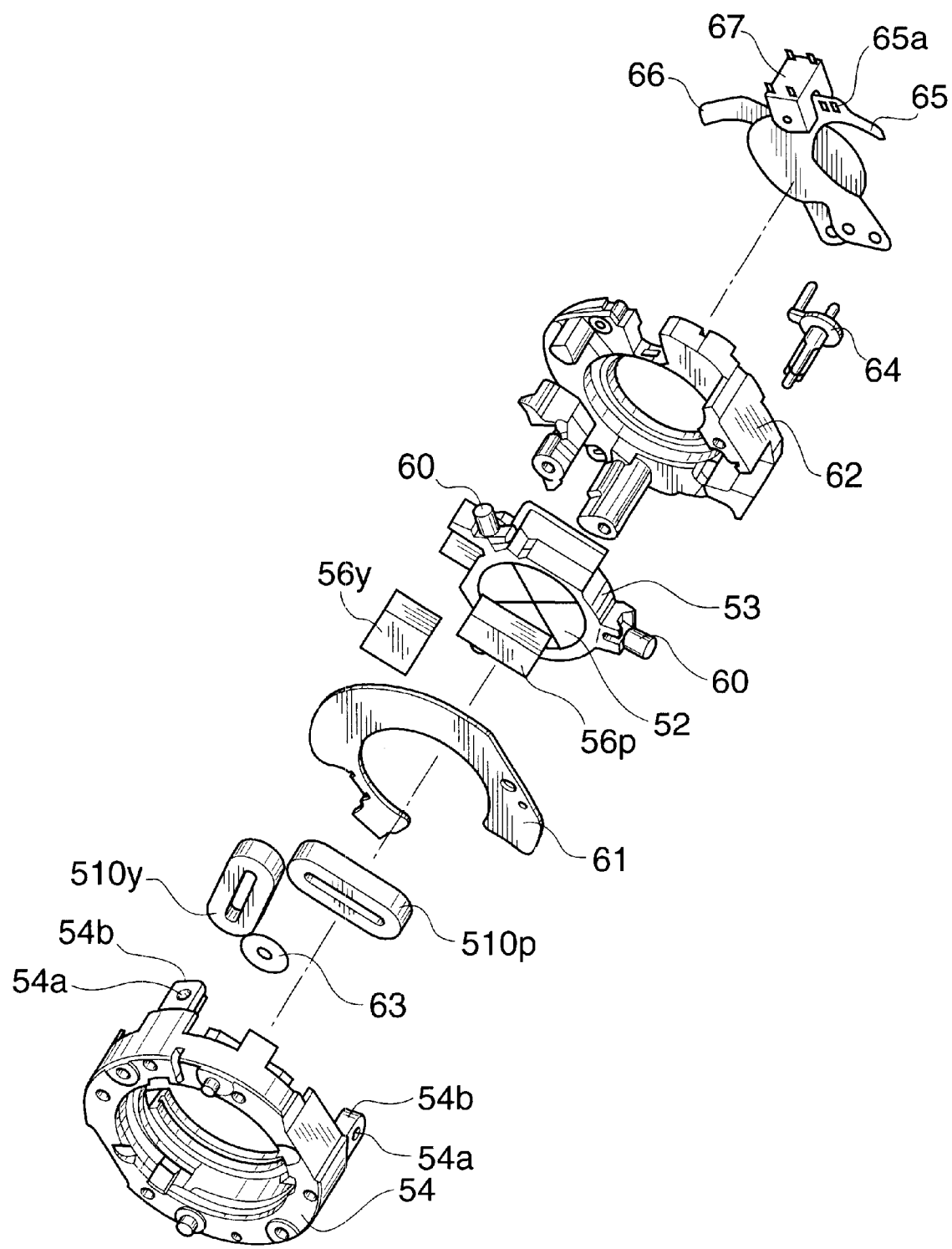
FIG. 1 is an exploded perspective view of a lens barrel section of a camera provided with an image-shake correcting device according to an embodiment of the present invention.
Figure 2:
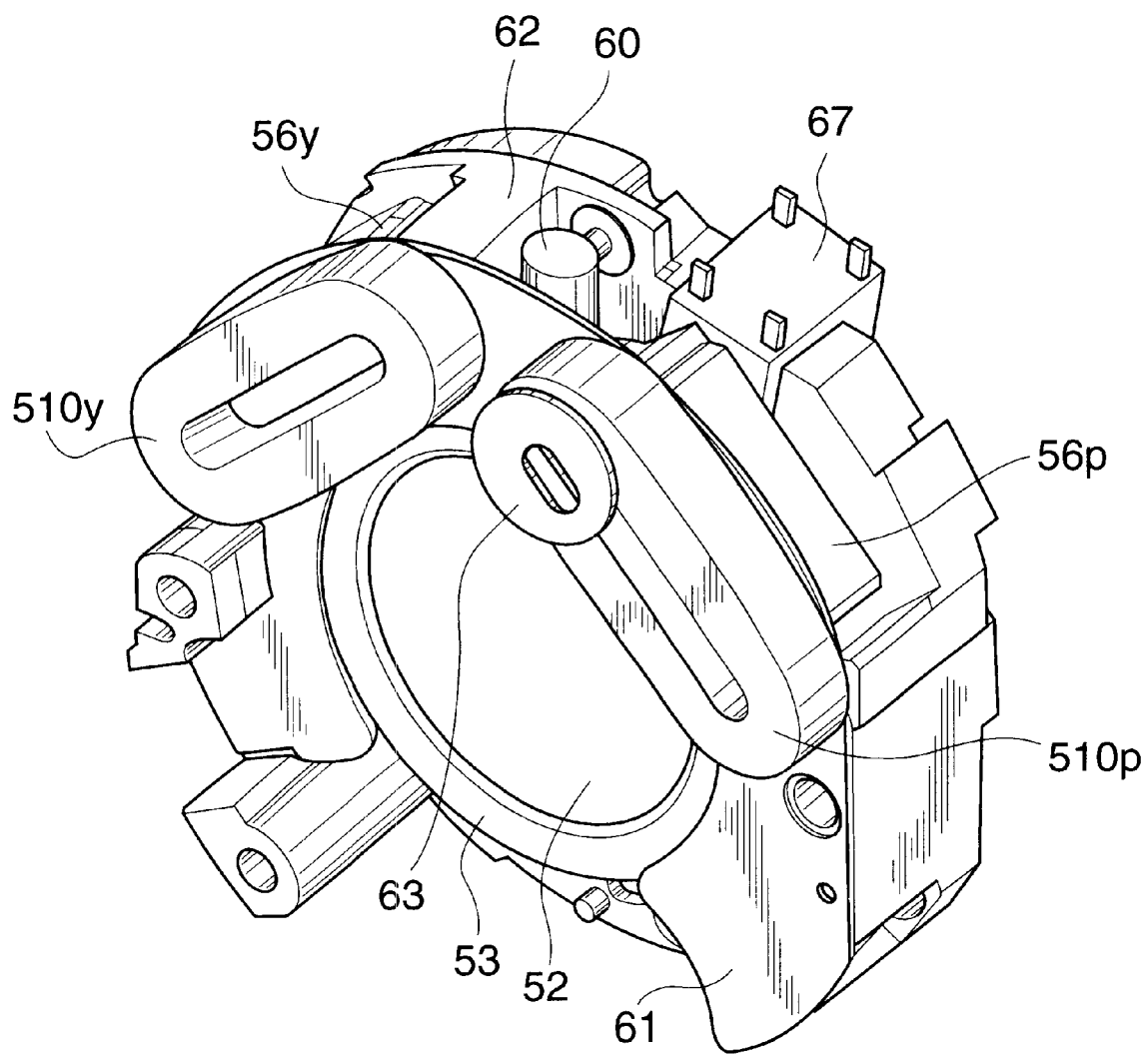
FIG. 2 is a perspective view of the image-shake correcting device in FIG. 1.
Figure 3:
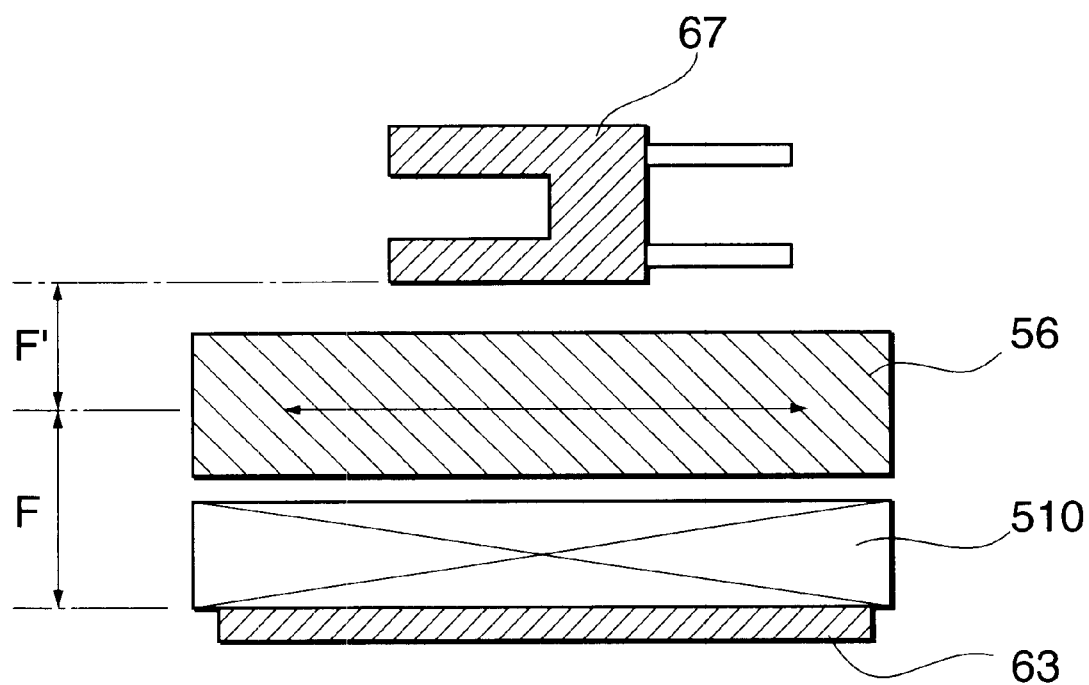
FIG. 3 is a sectional view showing the construction of essential parts of a lens barrel in FIG. 2.
Figure 4A:
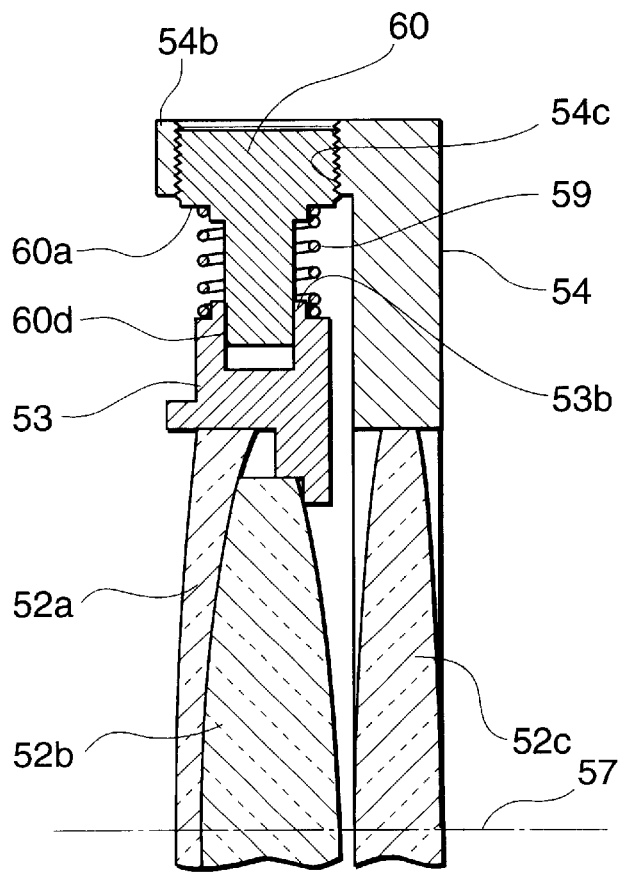
Figure 4B:
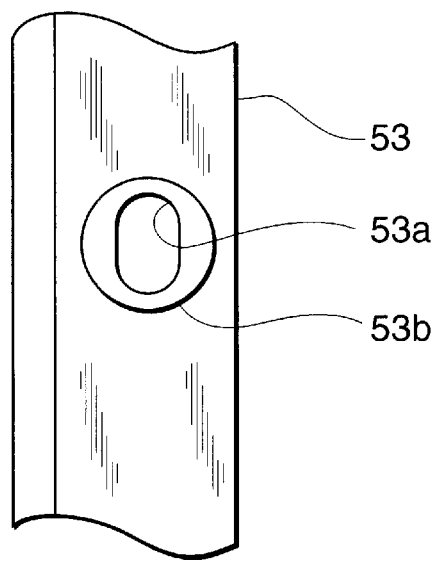

FIG. 1 is an exploded perspective view of a lens barrel section of a camera provided with an image-shake correcting device according to an embodiment of the present invention. FIG. 2 is a perspective view of the image-shake correcting device in FIG. 1. FIG. 3 is a sectional view showing the construction of essential parts of the lens barrel in FIG. 2. FIGS. 4A and 4B are views useful in explaining how a support frame for a correcting lens in FIG. 2 is supported, in which FIG. 4A is a fragmentary sectional view of the support frame, and FIG. 4B is a fragmentary enlarged view of the support frame. In FIG. 2, for the convenience of explanation, a base plate 54, shown in FIG. 1, is omitted.

Figure 13:
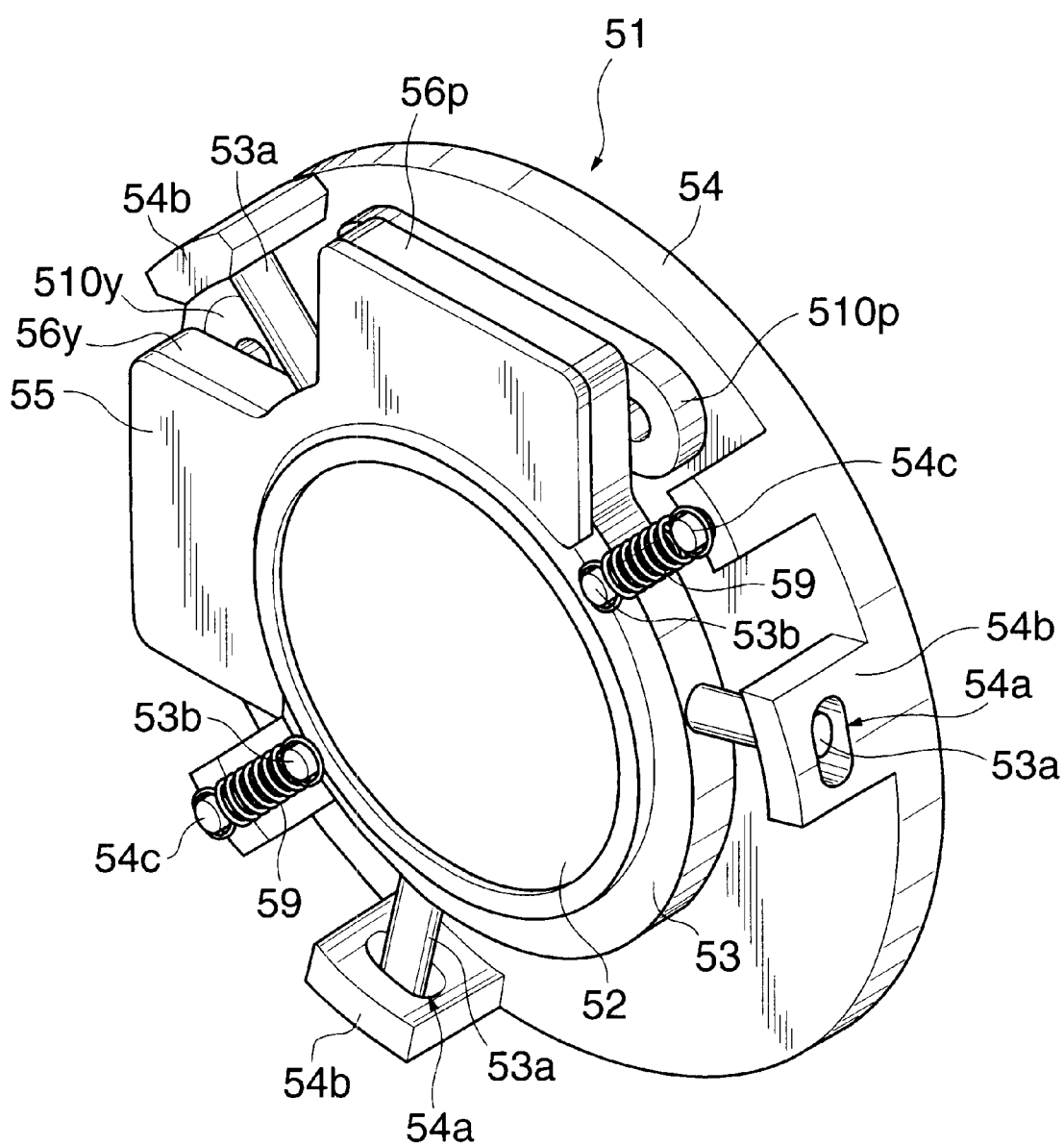
FIG. 13 is a perspective view of the correcting means 51 in FIG. 9.

The construction of these figures is different from the prior art described before with reference to FIG. 13 in that a compression coil spring 59 (see FIG. 4A) is arranged coaxially with a support shaft 50 projecting from a support frame 53 in a direction intersecting with an optical axis 57. The construction of these figures is also different from the prior art in that the support shafts 60 and the compression coil springs 59 are arranged in a fashion radially extending from the optical axis 57 at three circumferential locations; the support frame 53 and the support shafts 60 can slide relative to each other in a plane substantially orthogonal to the photographic optical axis; and a counter plate, described later, is provided as a second magnetic member.

As shown in FIG. 4A, one end of each compression coil spring 59 is fitted on a spring seat portion 53b of the support frame 53, while the other end thereof is fitted on a spring seat portion 60a of the corresponding support shaft 60. As the compression coil spring 59 is compressed, the inner diameter thereof is increased. The inner diameter of each compression coil spring 59 and the outer diameters of the seat portions 53a and 60a are set such that even when the compression coil spring 59 is compressed to the maximum extent after the support frame 53 slides on the support shaft 60 to increase the inner diameters of the ends of the compression coil spring 59 at the spring seat portions 53b and 60a of the support frame 53 and the support shaft 60, the compression coil spring 59 remains fitted on the spring seat portions 53b and 60a, without causing back-lash between the spring seat portion 53b and the compression coil spring 59 and between the spring seat portion 60a and the compression coil spring 59.

This is because while the support frame 53 is being driven, if the relationship between the inner diameter of the compression coil spring 59 and the outer diameters of the spring seat portions 53a and 60a gets out of its proper relationship so that the compression coil spring 59 and the spring seat portions 53a and 60a are brought out of their fitted state into a shaky state, then the driving condition of the support frame 53 immediately changes to reduce image shake correcting accuracy.

The support shaft 60 is inserted into the coil spring 59 while being rotated through a threaded portion 54c formed in a side wall portion 54b of the base plate 54. Further, the support shaft 60 has a sliding portion 60d inserted into an elongated hole 53a (see FIG. 4B) in the support frame 53. The sliding portion 60d of the support shaft 60 and the elongated hole 53a in the support frame 53 are sized such that the former can be snugly fitted in the latter. The support shaft 60 and the support frame 53 can move relative to each other.

Figure 11:
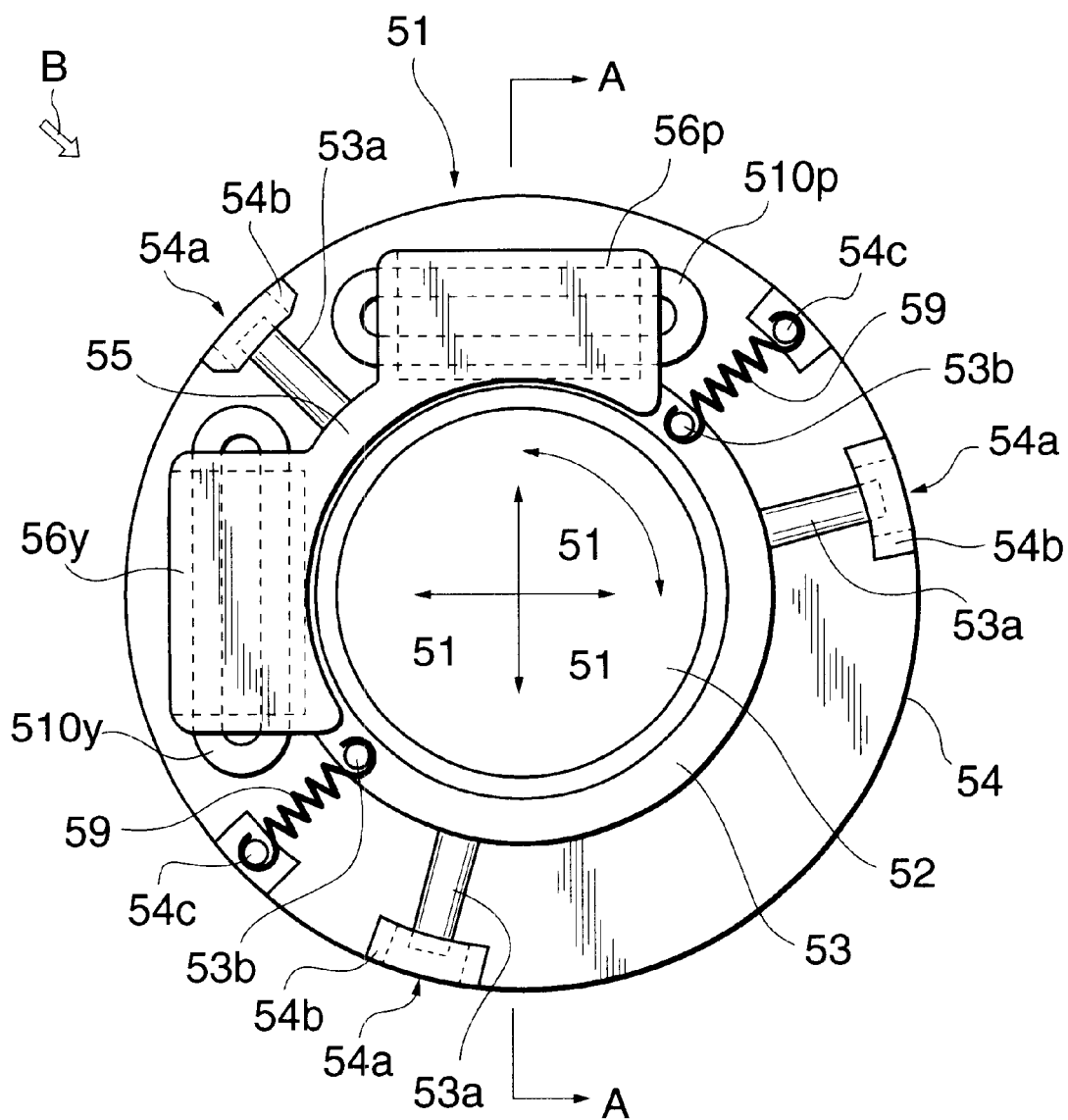
FIG. 11 is a front view of correcting means in FIG. 9.
Figure 12A:
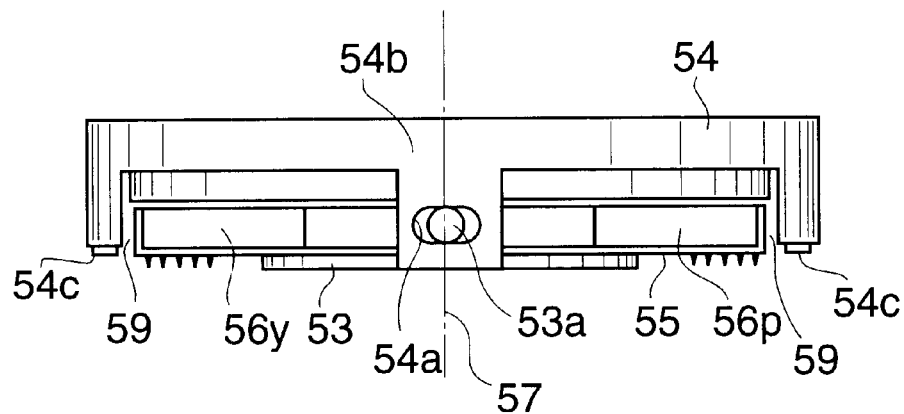

The support frame 53 is elastically supported on the base plate 54 by the three compression coil springs 59. Thus, the position of the support frame 53 is restricted in the direction of the photographic optical axis (the direction shown by the optical axis 57 in FIG. 12A) with respect to the base plate 54 by the sliding portion 60d of the support shaft 60 and the elongated hole 53a in the support frame 53. Further, the compression coil springs 59 cause the support frame 53 to be elastically supported on the base plate 54 in the directions of arrows 58p, 58y, and 58r (see FIG. 11). Thus, the support frame 53 can move freely in a plane that is orthogonal to the photographic optical axis without becoming shaky in the direction of the photographic optical axis with respect to the base plate 54.

Permanent magnets 56ya and 56p and a correcting lens 52 are mounted on the support frame 53 (see FIG. 2). When current flows through coils 510p and 510y, the permanent magnets 56ya and 56p and the correcting lens 52 move in unison with the support frame 53 in a plane perpendicular to the photographic optical axis, to carry out image shake corrections.

In FIG. 1, a shutter plate 62 is attached to the base plate 54 by screws and serves to prevent the support frame 53 from becoming shaky in the direction of the photographic optical axis. Further, shutter blades 65 and 66 can slide on the shutter plate 62. A photo interrupter (first magnetic member) 67 is provided as means for detecting the positions of the shutter blades 65 and 66, and in the present embodiment, the photo interrupter 67 serves as a position detecting element and is comprised of a metal terminal made of a magnetic material which is insert-molded in a resin member. As the photo interrupters 67 of this type, those comprised of metal terminals made of magnetic materials which are currently available on the market are the mainstream for the production line rationalization. The photo interrupter 67 detects edges of a plurality of rectangular slits 65a formed in the shutter blade and outputs a signal for controlling the driving of the shutter. A drive pin 64, which is made of a magnet, drives the two shutter blades 65 and 66. The drive pin 64 is rotatively driven by a shutter coil, not shown, when the latter is electrically energized.

A damper plate 61, which is comprised of a non-magnetic metal plate, suppresses high-frequency movement of the camera due to disturbances such as shakes caused by movement of a motor car in which the photographer is riding, in response to eddy current generated in the damper plate 61 by relative motion of the permanent magnets 56p and 56y, thereby preventing the device from being damaged. The damper plate 61 also plays a role in positioning the coils 510p and 510y in the direction of the photographic optical axis. Correcting means (correcting optical unit) is constituted by the permanent magnets 56p and 56y, the support frame 53, the correcting lens 52, and others, and serves to stabilize the gaps between the permanent magnet 56p and the coil 510p and between the permanent magnet 56y and the coil 510y, thereby achieving accurate image shake corrections.

The shutter, which is comprised of the shutter plate 62, shutter blades 65 and 66, and photo interrupter 67, and the correction means are juxtaposed in the direction of the photographic optical axis so that the photo interrupter 67 as the first magnetic member and the permanent magnet 56 (56p and 56y) forming part of the correcting means are located in proximity to each other in the direction of the photographic optical axis. Consequently, an electromagnetic attractive force F' is generated between the permanent magnet 56 and the photo interrupter 67 to hinder movement of the correcting means, thereby degrading the image stablization performance.

To eliminate this inconvenience, the counter plate 65 as the second magnetic member, which is comprised of an iron-based metal plate, is arranged opposite the photo interrupter 67 via the permanent magnet 56, that is, on a side of the coil 510 (510p or 510y) which is closer to the base plate 54, so as to exert an electromagnetic attractive force F that has substantially the same intensity as the electromagnetic attractive force F' generated between the photo interrupter 67 as the first magnetic member and the permanent magnet 56 (see FIG. 3).

With the counter plate 63, the electromagnetic attractive force F' exerted between the permanent magnet 56 and the photo interrupter 67 as the first magnetic member located in an area covered by the magnetic force of the permanent magnet 56 as a movable part can be offset by the electromagnetic attractive force F exerted between the counter plate 63 and the permanent electrode 56. This enables the correcting means to be arranged without taking into consideration the presence of the first magnetic member.

In the present embodiment, it is assumed that the electromagnetic attractive force F exerted between the counter plate 63 and the permanent magnet 56 is adjusted by varying the thickness of the counter plate 63. However, the electromagnetic attractive force may be adjusted by the following other methods, for example:

1) varying the distance between the counter plate 63 and the permanent magnet 56, 2) varying the area of a part of the counter plate 63 that faces the permanent magnet 56, or 3) changing the material for the counter plate 63.

According to the above-described first embodiment, the image-shake correction device is comprised of the movable permanent magnet 56 forming part of the correcting means, the fixed coil 51 located away from the permanent magnet 56 in the direction of the photographic optical axis, the photo interrupter 67 as the first magnetic member located away from the permanent magnet 56 in the direction of the photographic optical axis, and the counter plate 63 as the second magnetic member located away from the permanent magnet 56 in the direction of the photographic optical axis and at a side of the permanent magnet 56 remote from the photo interrupter 67, and the photo interrupter 67, permanent magnet 56, coil 510, and counter plate 63 are arranged in this order so as to make the electromagnetic attractive force F' exerted between the photo interrupter 67 and the permanent magnet 56 substantially equal to the electromagnetic attractive force F exerted between the counter plate 63 and the permanent magnet 56.

As a result, the adverse effects of the photo interrupter 67 as the first magnetic member upon the correcting means that carries out image shake corrections can be offset, thereby increasing the degree of freedom of layout and providing a small-sized lens barrel having a simple construction and an accurate image shake correcting function.

Although in the above-described first embodiment, the present invention is applied to a lens barrel containing a shutter and correcting means, the present invention is not limited to this but is applicable to other optical apparatuses having magnetic members and correcting means as well as to small-sized cameras.

Figure 5:
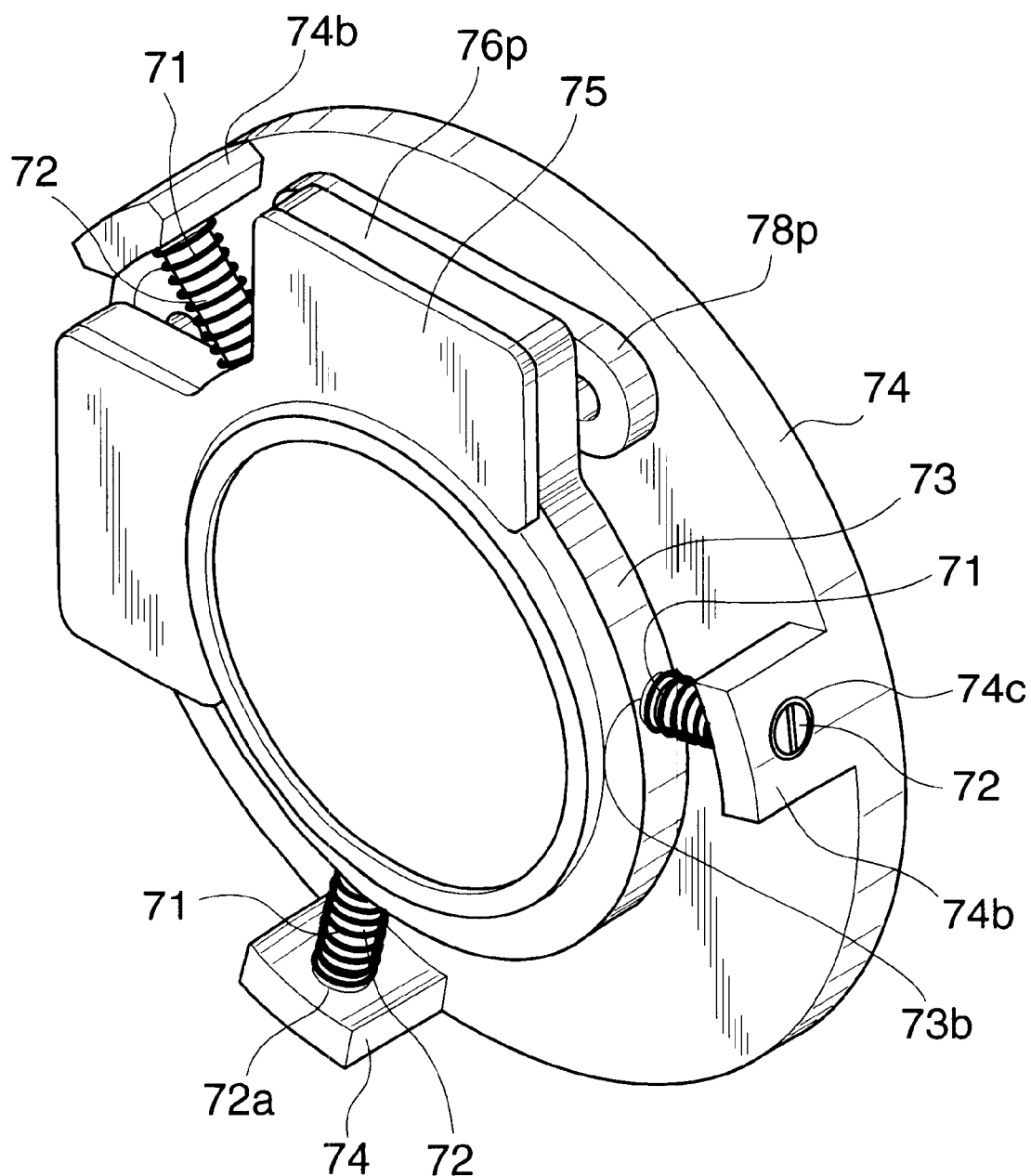
FIG. 5 is a perspective view of an image-shake correcting device according to a second embodiment of the present invention.
Figure 6A:
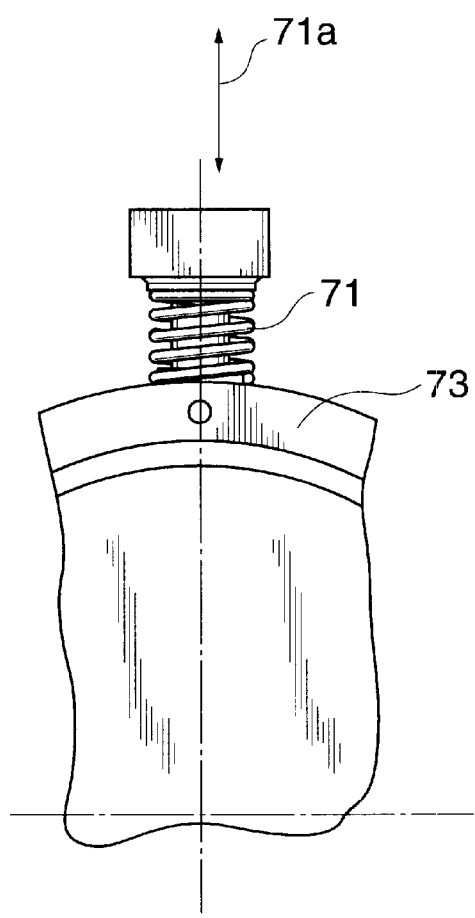
Figure 6B:
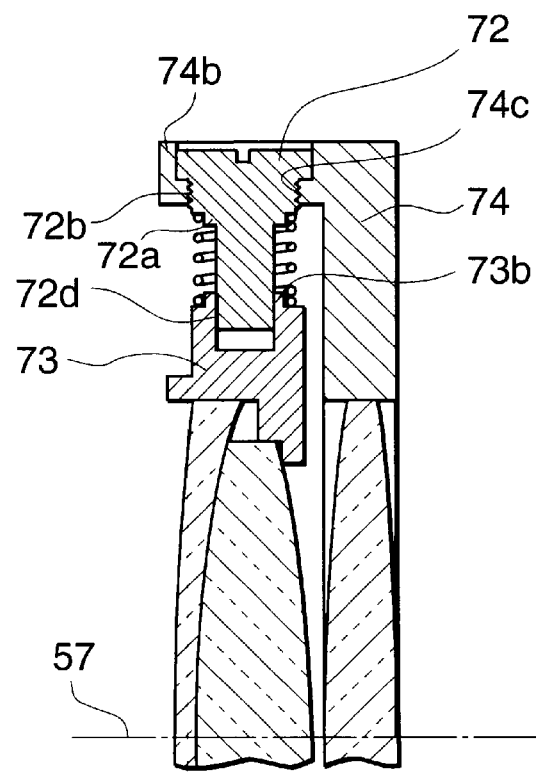
Figure 6C:
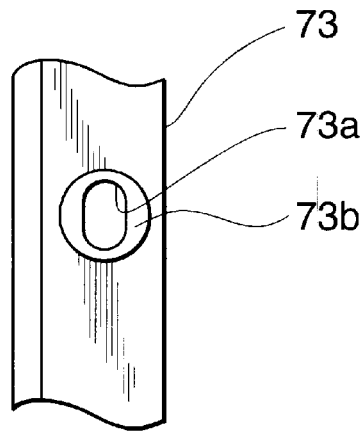

FIG. 5 is a perspective view of an image-shake correcting device according to a second embodiment of the present invention. FIGS. 6A to 6C are views showing the construction of essential parts of the image-shake correcting device in FIG. 5.

Figure 12B:
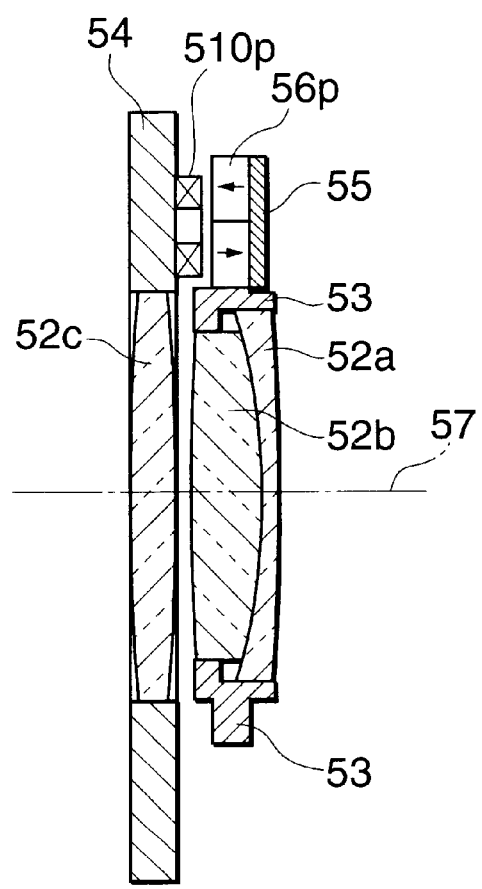

The second embodiment is different from the prior art described before with reference to FIG. 12 in that compression coil springs 71 are arranged coaxially with corresponding support shafts 72, and a support frame 73 and each support shaft 72 slide relative to each other in a plane substantially orthogonal to the optical axis. Further, the present embodiment is distinguished from the first embodiment in that the elastic force of each compression coil spring 71 can be adjusted by moving the corresponding support shaft 72 in its axial direction.

One end of the compression coil spring 71 is fitted on a spring seat portion 73b of the support frame 73, while the other end thereof is fitted on a spring seat portion 72a of the corresponding support shaft 72. As the compression coil spring 71 is compressed, the inner diameter thereof is increased. However, the inner diameter of each compression coil spring 71 and the outer diameters of the seat portions 73a and 72a are set such that even when the compression coil spring 71 is compressed to the maximum extent after the support frame 73 slides on the support shaft 72 to increase the inner diameters of the ends of the compression coil spring 71 at the spring seat portions 73b and 72a of the support frame 73 and the support shaft 72, the compression coil spring 71 remains fitted on the spring seat portions 73b and 72a, without causing back-lash between the spring seat portion 73b and the compression coil spring 71 and between the spring seat portion 72a and the compression coil spring 71.

This is because while the support frame 73 is being driven, if the relationship between the inner diameter of the compression coil spring 71 and the outer diameters of the spring seat portions 73a and 72a gets out of its proper relationship so that the compression coil spring 71 and the spring seat portions 73a and 72a are brought out of their fitted state into a shaky state, then the driving condition of the support frame 73 immediately changes to reduce image shake correcting accuracy.

The support shaft 72 is inserted into the compression coil spring 71 while being rotated through a threaded portion 74c formed in a side wall portion 74b of a base plate 74. Further, the support shaft 72 has a sliding portion 72d (FIG. 6B) inserted into an elongated hole 73a (FIG. 6C) in the support frame 73. The sliding portion 72d of the support shaft 72 and the elongated hole 73a in the support frame 73 are sized such that the former can be snugly fitted in the latter. The support shaft 72 and the support frame 73 can move relative to each other. The support frame 73 is elastically supported on the base plate 74 by the three compression coil springs 71 in a manner being movable in a spring force acting direction 71a.

Thus, the position of the support frame 73 is restricted in the direction of the optical axis 57 (see FIG. 12A) with respect to the base plate 74 by the sliding portion 72d of the support shaft 72 and the elongated hole 73a in the support frame 73. Further, the compression coil springs 71 cause the support frame 73 to be elastically supported on the base plate 74 in the directions of the arrows 58p, 58y, and 58r (see FIG. 11). Thus, the support frame 73 can move freely in a plane that is orthogonal to the optical axis 57 without becoming shaky in the direction of the optical axis 57 with respect to the base plate 74.

The support shaft 72 is provided with a threaded portion 72b. When the threaded portion 72b is screwed into the threaded portion 74c formed in the side wall portion 74b of the base plate 74, the position of the compression coil spring 71 changes to cause a corresponding change in the position of the support frame 73, thereby allowing the position of the support frame 73 to be adjusted with respect to the base plate 74, i.e. allowing the optical axis of the correcting lens to be adjusted with respect to the photographic optical axis.

If an attempt is made to reduce the size of the image-shake correcting device while maintaining a required moving stroke of the device, most of the moving stroke is used for a change in the position of the support frame 73 relative to the base plate 74 due to tolerances of the compression coil spring 71, whereby a proper shake correction stroke cannot be secured during shake corrections. Therefore, the support shafts 72 are moved forward and backward in the axial direction to adjust the position of the support frame 73.

According to the above-described second embodiment, the image-shake correcting device is comprised of the support frame 73 provided in the taking lens barrel to hold the correcting lens for shake corrections, the support shafts 72 provided in the base plate 74 to support the support frame 73 in a manner allowing the same to slide in a plane that is substantially orthogonal to the optical axis 57 of the taking lens barrel, the compression coil springs 71 that elastically supports the support frame 73 on the taking lens barrel, and a drive device that drives the support frame 73 in a sliding direction, and each of the compression coil springs 71 and the corresponding support shaft 72 are arranged substantially coaxially with each other, and the support shaft 72 is mounted on the base plate 74 in a manner being movable in the axial direction of the support shaft 72. As a result, the image-shake correcting device can be designed compact in size without lowering the shake correcting accuracy.

Figure 7:
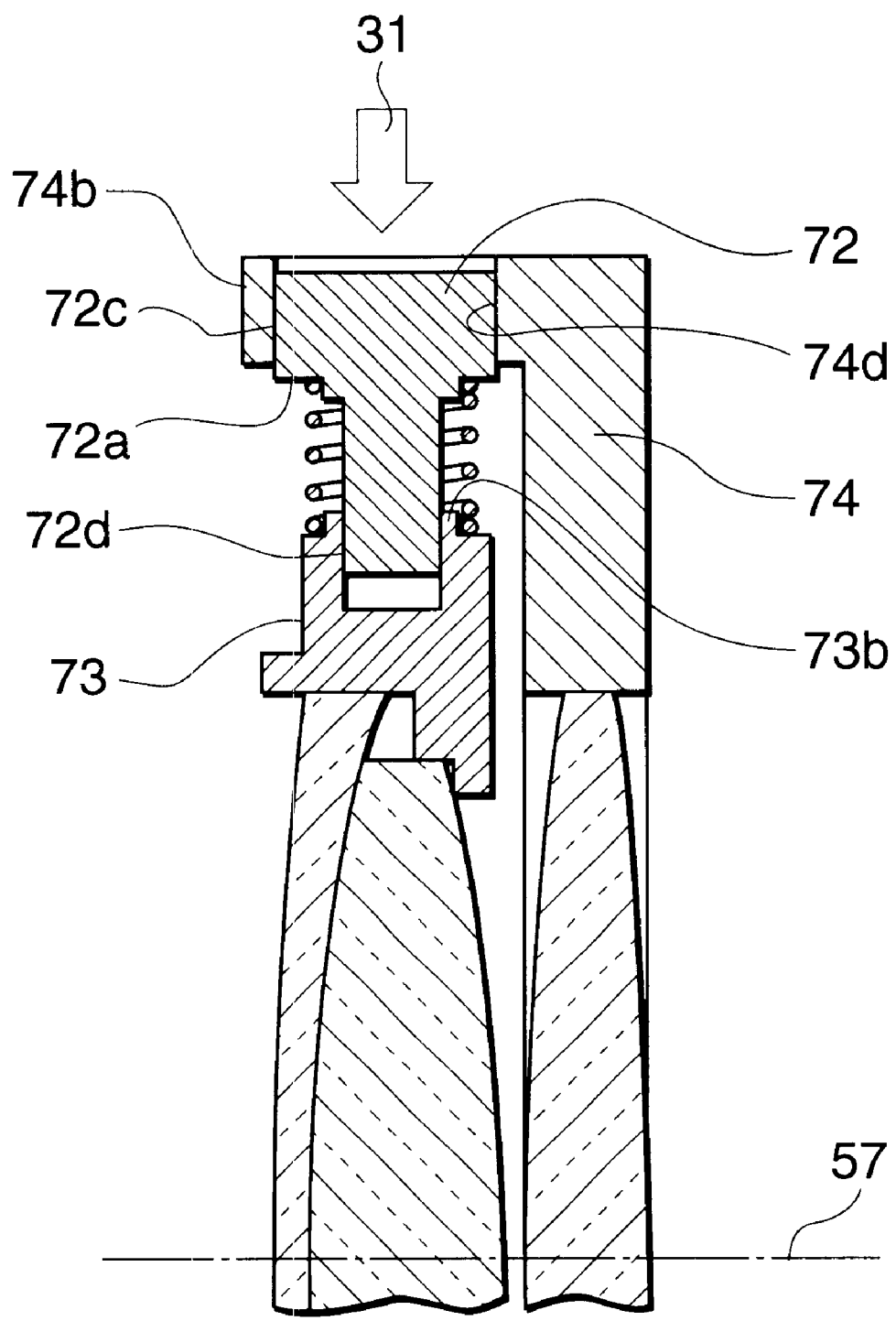
FIG. 7 is a fragmentary sectional view showing the construction of essential parts of an image-shake correcting device according to a third embodiment of the present invention.
Figure 8:
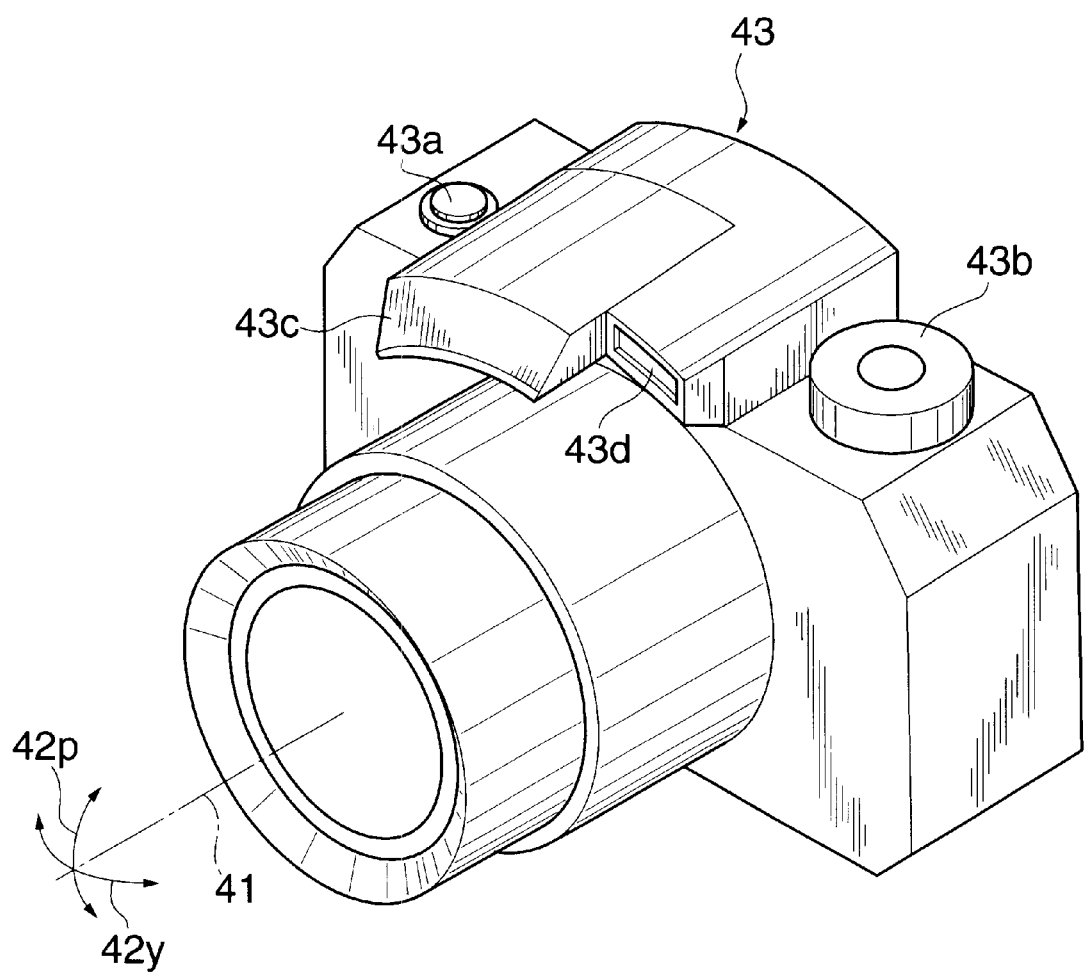
FIG. 8 is a perspective view showing the entire appearance of a camera having a conventional image stabilizing system mounted therein.
Figure 9:
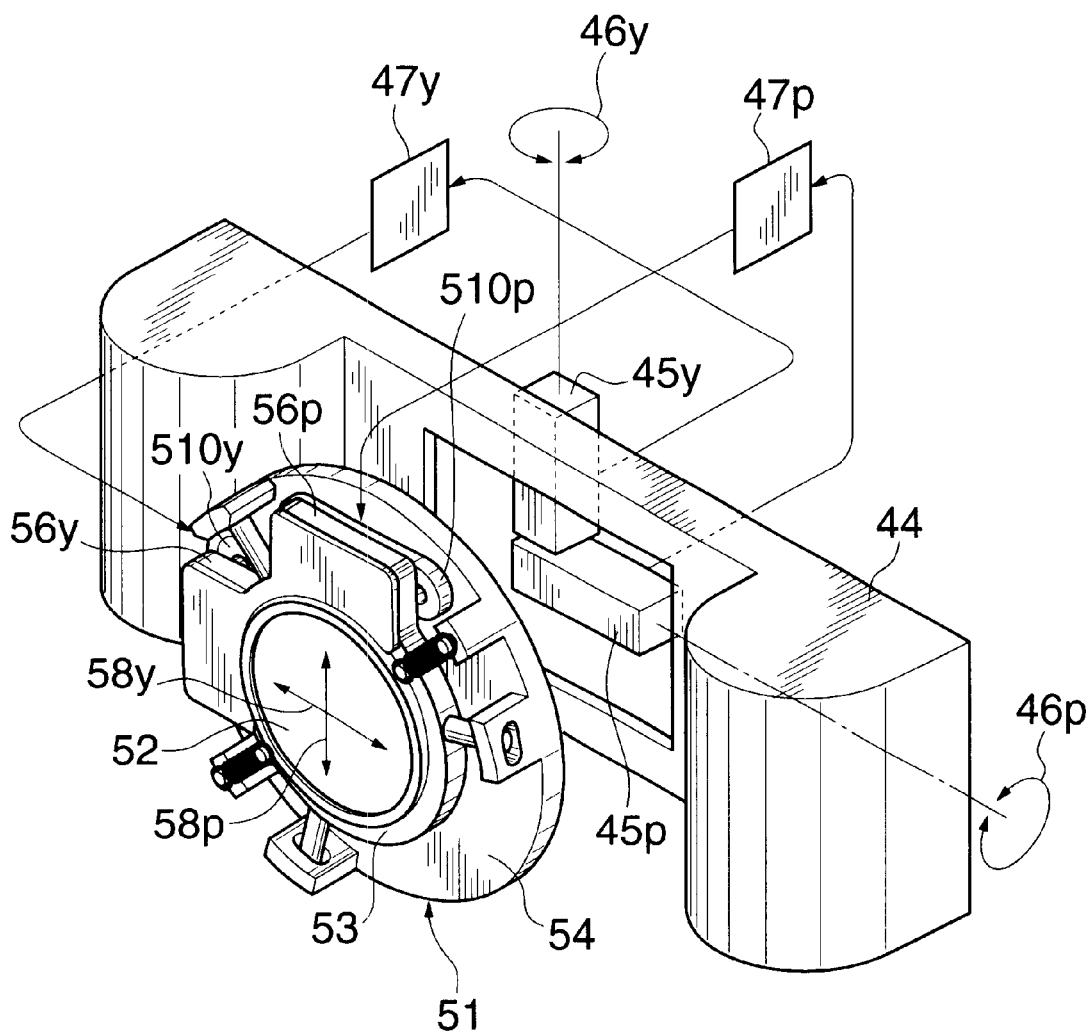
FIG. 9 is a perspective view showing the internal construction of the camera in FIG. 8.
Figure 10:
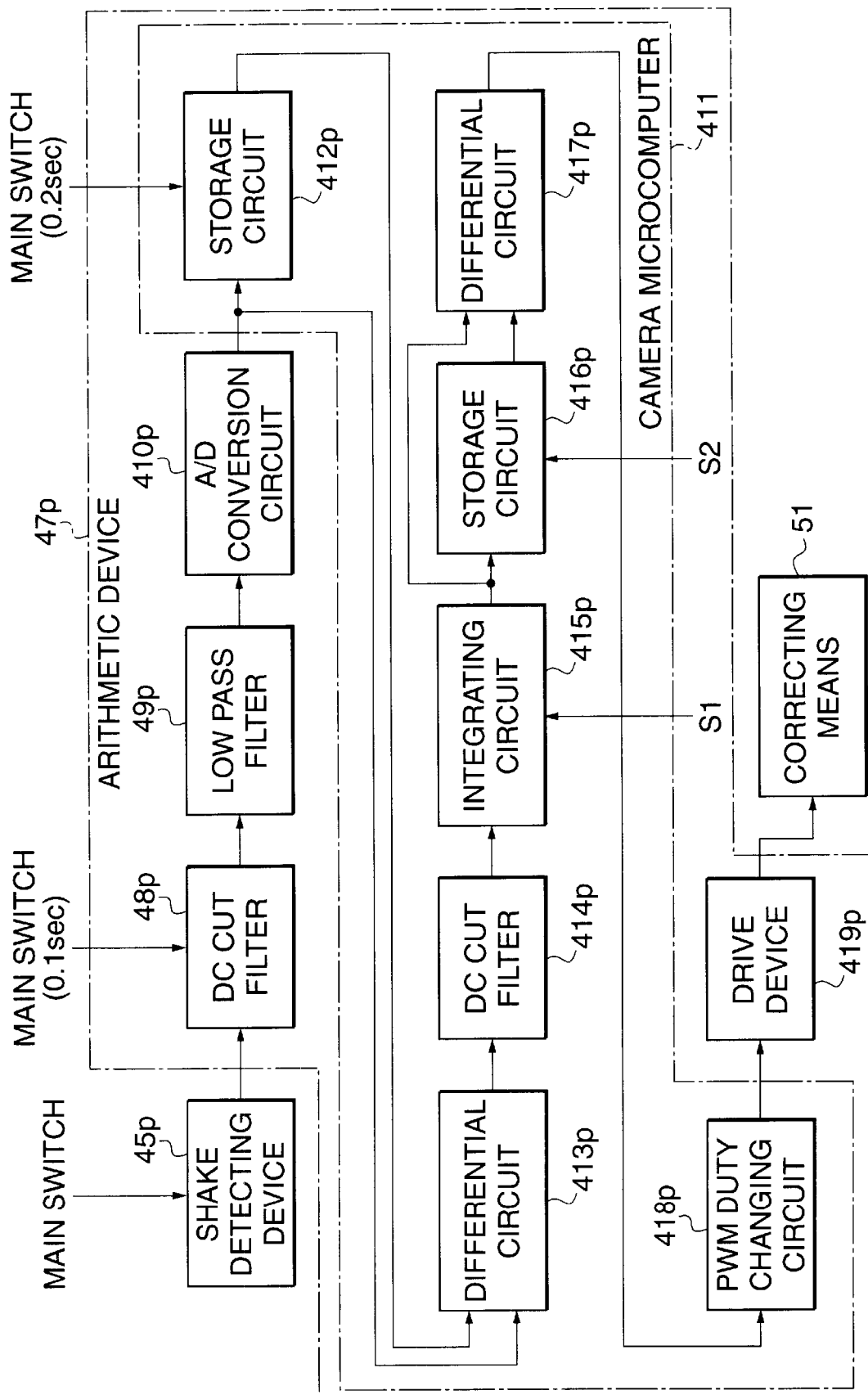
FIG. 10 is a block diagram showing the details of arithmetic devices 47p and 47y in FIG. 9.

FIG. 7 is a view showing the construction of essential parts of an image-shake correcting device according to a third embodiment of the present invention. The third embodiment is obtained by partially changing the construction of FIGS. 6A to 6C, described above. Specifically, the present embodiment is different from the construction of FIGS. 6A to 6C in that the support shafts 72 are press-fitted in the base plate 74 instead of being threaded fitted. The other parts of the construction of the present embodiment are the same as those of the above-described second embodiment.

With this construction, a plate fitting portion 72c of each support shaft 72 is press-fitted into a support shaft fitting portion 74d of the side wall portion 74b of the base plate 74. By moving the support shafts 72 in an axial direction 31 thereof to change the positions of the compression coil springs 71, the position of the support frame 73 is adjusted. Since the support shafts 72 are press-fitted in the base plate 74, it is no longer necessary to fix the support shafts 72 and the base plate 74 by an adhesive or the like after the position adjustment.

By thus press-fitting the plate fitting portion 72c of each support shaft 72 into the support shaft fitting portion 74d of the side wall portion 74b of the base plate 74, the shake-correcting device can be more efficiently assembled, and the costs of parts can be reduced.

According to the above-described third embodiment, the support frame 73 that supports the correcting lens and the compression coil springs 71 that apply elasticity to the correcting lens in the correcting lens driving direction are arranged at substantially the same location as shown in FIGS. 5 to 7 to thereby reduce the space occupied by members such as the compression coil springs 71. This can provide a small-sized and inexpensive image-shake correcting device that can be driven with high accuracy. Further, the support shafts 72 that support the support frame 73 have the function of adjusting the elastic force of the compression coil springs 71, which is imparted by the threaded portions 72b and 74c, the plate fitting portion 72c, and the support shaft fitting portion 74d. This prevents the shake correcting accuracy from being degraded due to failure to ensure an appropriate shake correction stroke during shake corrections. Moreover, the components of a device or apparatus (in this example, a taking lens barrel) in which the present shake-correcting device is mounted can be arranged in the above-mentioned reduced space, thereby enabling the device or apparatus to be designed compact in size.

What is claimed is:

1. An image-shake correcting device comprising:
    a correcting optical unit having an optical axis;
    at least one magnet member provided in said correcting optical unit;
    at least one coil member arranged away from said magnet member in a direction of the optical axis;
    a first magnetic member arranged away from said magnet member in the direction of the optical axis; and
    a second magnetic member arranged away from said magnet member in the direction of the optical axis and at a side of said magnetic member remote from said first magnetic member; and
    wherein energization of said coil member causes said correcting optical unit to be driven in a direction intersecting with the optical axis to correct image shakes.

2. An image-shake correcting device as claimed in claim 1, wherein an electromagnetic attractive force exerted between said magnet member and said first magnetic member is substantially equal to an electromagnetic attractive force exerted between said magnet member and said second magnetic member.

3. An image-shake correcting device as claimed in claim 1, wherein said first magnetic member comprises a position detecting element having a metal terminal.

4. An image-shake correcting device as claimed in claim 3, wherein said position detecting element is a photo interrupter.

5. An image-shake correcting device as claimed in claim 1, wherein said second magnetic member comprises an iron-based metal plate.

6. An image-shake correcting device as claimed in claim 1, further comprising a support member that supports said correcting optical unit in a manner permitting same to move in the direction intersecting with the optical axis, and at least one support shaft provided on said support member and projected therefrom in the direction intersecting with the optical axis, and wherein said correcting optical unit has a fitting portion in which said support shaft is fitted, said correcting optical unit being driven in the direction intersecting with the optical axis in response to sliding of said support shaft in said fitting portion.

7. An image-shake correcting device as claimed in claim 6, wherein said support shaft is adjustable in position relative to said support member in a direction of the optical axis.

8. An image-shake correcting device as claimed in claim 7, further comprising an urging member provided on said support shaft, for urging said correcting optical unit in the direction of the optical axis.

9. An image-shake correcting device comprising:

a correcting optical unit having an optical axis and at least one fitting portion;

a support member that supports said correcting optical unit in a manner permitting same to move in a direction intersecting with the optical axis; and a driving unit that drives said correcting optical unit relative to said support member in the direction intersecting with the optical axis;

at least one support shaft provided on said support member, said support shaft being fitted in said fitting portion and projected from said support member in the direction intersecting with the optical axis, said support shaft being mounted on said support member in a manner being adjustable in position in a projecting direction thereof relative to said support member; and at least one urging member provided on said support shaft, for urging said correcting optical unit in the projecting direction thereof, wherein an urging force of said urging member can be adjusted by adjusting a position of said support shaft, and wherein a driving force of said driving unit drives said correcting optical unit to cause sliding of said correcting optical unit on said support shaft to correct image shakes.

10. An image-shake correcting device as claimed in claim 9, wherein said urging member comprises a compression coil spring fitted on said support shaft.

11. An image-shake correcting device as claimed in claim 9, wherein said support shaft is threadedly coupled with said support member.

* * * * *

UNITED STATES PATENT AND TRADEMARK OFFICE
CERTIFICATE OF CORRECTION

PATENT NO.    : 6,606,456 B2
DATED         : August 12, 2003
INVENTOR(S)   : Nobuhiro Fujinaga It is certified that error appears in the above-identified patent and that said Letters Patent is hereby corrected as shown below:

<u>Column 5,</u>
Line 64, "support frame 5a" should read -- support frame 53 --.

<u>Column 8,</u>
Line 20, "and and" should read -- and --.

Signed and Sealed this

Tenth Day of February, 2004

JON W. DUDAS
*Acting Director of the United States Patent and Trademark Office*